United States Patent

[11] 3,633,213

[72] Inventors Frank E. Hublou Richmond; Timothy L. Lenox, San Leandro, both of Calif.

[22] Filed Aug. 19, 1969

[45] Patented Jan. 4, 1972

[73] Assignee Kaiser Aluminum & Chemical Corporation

[54] SCHEDULE PROGRAM FOR REMOTE INPUT MANAGEMENT SYSTEM
20 Claims, 1 Drawing Fig.

[52] U.S. Cl. .......... 444/1, 340/172.5

[51] Int. Cl. .......... G06f 9/18

[50] Field of Search .......... 340/172.5; 235/157

[56] References Cited

UNITED STATES PATENTS

| | | | |
|---|---|---|---|
| 3,400,376 | 9/1968 | McDonnell.................. | 340/172.5 |
| 3,411,143 | 11/1968 | Beausoleil et al............ | 340/172.5 |
| 3,412,382 | 11/1968 | Coleur et al. ................ | 340/172.5 |

OTHER REFERENCES

IBM Operating System/360 Concepts and Facilities, File No. 5360- 36, Form C28- 6535- 0, 1965, pages 52- 62

IBM Operation System/360 Introduction, File No. 5360- 20, Form C28- 6534- 0, 1964, pages 12- 13

*Primary Examiner*—Gareth D. Shaw
*Assistant Examiner*—Sydney R. Chirlin
*Attorney*—Fulwider Patton Rieber Lee & Utecht

ABSTRACT: This invention is a digital program written in ALGOL. Its function is to schedule programs stored in a certain format for execution as ordered by the input at a remote terminal in a data processing system. It is part of a software system in a data processing system.

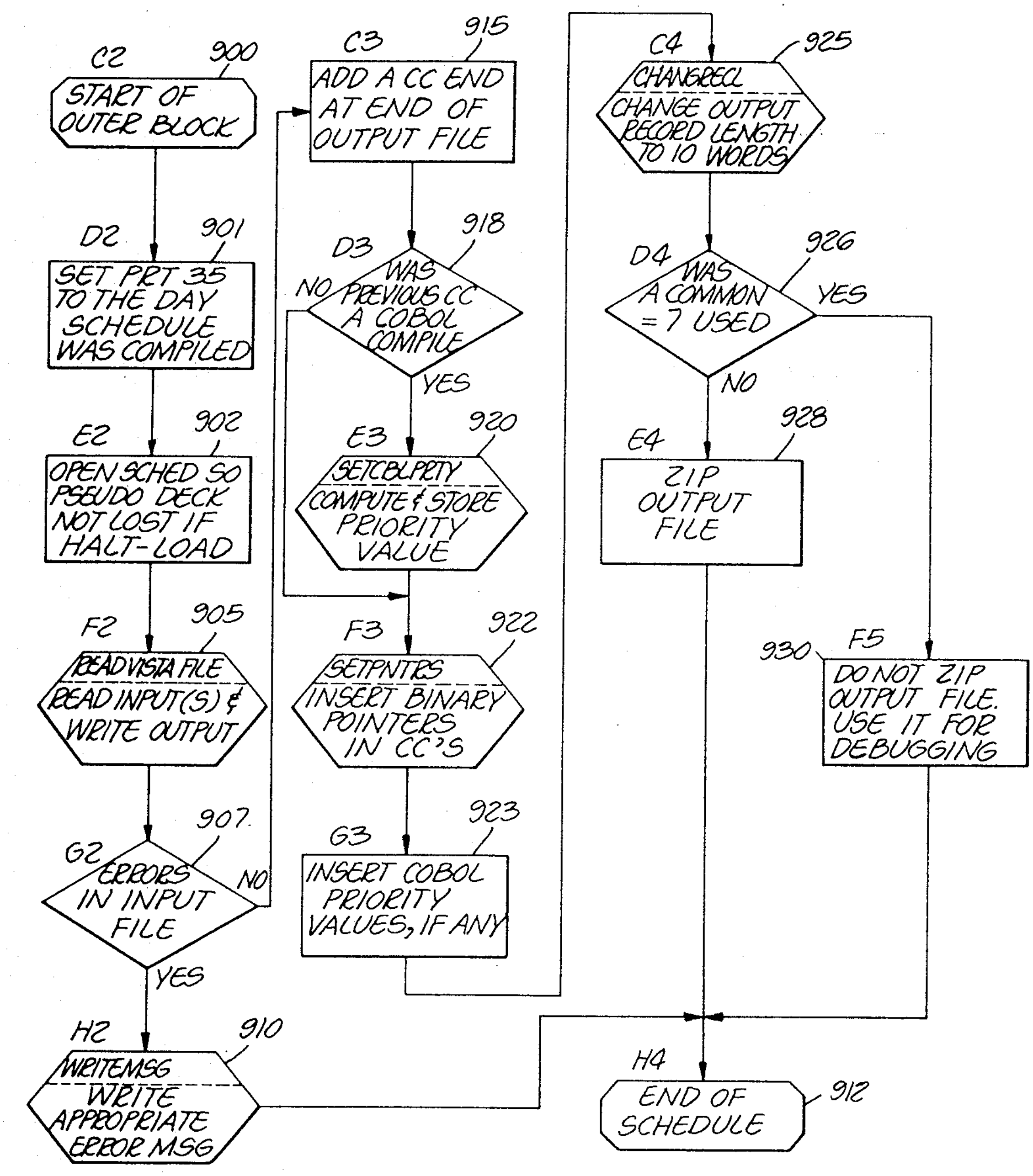
INVENTORS
FRANK E. HUBLOU
TIMOTHY L. LENOX
BY Fulwider, Patton, Rieber, Lee, and Utecht
ATTORNEYS

SCHEDULE PROGRAM FOR REMOTE INPUT MANAGEMENT SYSTEM

This invention relates to a digital computer program and, more particularly, to a program written in ALGOL to enable the user of a remote terminal to schedule execution of stored digital programs in a certain format.

In accordance with this invention, provision is made for computer execution of data stored in a predetermined sequence in a data file. The execution is controlled by entries made at terminal remote from the computer.

The program of this invention functions to convert the stored data file to a sequential form acceptable by the computer compiler. In addition, the program of this invention functions to resolve Kopy statements found in the files to be executed.

Material essential to the understanding of this invention is found in the application entitled "Remote Input Management System," Ser. No. 851,242, filed Aug. 19, 1969, and now U.S. Pat. No. 3,585,601, which material is herein incorporated by reference and made a part of this application.

More specifically, reference is made to Section VII of said application Ser. No. 851,242, entitled "SCHEDULE PROGRAM," including subsections 1, 2, 3, 4 and 5. Subsection 5, therein, contains the associated program source listing in ALGOL. The listing may be readily compiled by any compiler which will accept that language.

The drawing herein is the flow chart of the outer block of the Schedule program. In addition, reference is made herein to FIGS. 24A, 24B, 25A, 25B, and 26 in the above-cited application Ser. No. 851,242 for further disclosure herein.

What I claim is:

1. In a method of operating a digital computer connected in a network with one or more user's remote terminals, wherein a command is entered at a remote terminal for controlling the computer to execute a first program which in turn controls the computer to retrieve and execute a second program stored in indexed files designated by said command, the steps of controlling by said first program, translation of said second program contained in said indexed files to a sequential format, storage of said sequentially formatted second program, following storage of said sequentially formatted second program, creation of appropriate control cards to be used in execution of said second program, storage of said control cards with said sequentially formatted second program, and execution of the sequentially formatted second program by the computer.

2. The method of claim 1, further comprising the step of controlling a determination of whether the file is a COBOL file, and if it is found to be, a determination of the COBOL compile priority value.

3. The method of claim 2, further comprising the step of controlling storage of the determined priority value.

4. The method of claim 1, further comprising the step of controlling termination of the program following the step of controlling execution of the stored file.

5. The method of claim 1, wherein said translation step includes the steps of controlling a determination of whether the file designated in the entered command to be executed exists, a determination of whether the file designated in the entered command to be executed is in use by another command or program, transmission of error messages if it is determined that the named file does not exist or the named file is in use, reading of the indices from the file to be executed into storage if it is determined that the designated file exists and is not in use, and transferring data referenced by said indices to output storage devices.

6. The method of claim 1, further comprising the step of controlling a determination of whether said step of controlling execution of the sequentially formatted second program is accomplished or bypassed.

7. The method of claim 1, wherein said translation and storage steps comprise the steps of controlling a determination of the data format to be followed in said sequential file, reading of sequence reference numbers from the file to be executed, reading of data records associated with said sequence reference numbers, and, storage of said sequence reference numbers and associated data records in an output storage device in the format previously determined.

8. The method of claim 7, wherein said step of controlling reading of data records comprises the steps of controlling an examination of criteria for determining the class of information contained within said data record, and, a determination from said criteria of whether the information is ordinary data.

9. The method of claim 8, further comprising the step of controlling a determination of whether the output storage device is full after said storage of sequence reference numbers and associated data records.

10. The method of claim 1, further comprising the step of controlling transfer of the contents of said output storage device to a further storage device if it is determined that the output storage device is full.

11. The method of claim 10, further comprising the step of controlling a determination of whether all sequence reference numbers in the file to be executed have been read.

12. The method of claim 11, further comprising the step of controlling reading of further sequence reference numbers if it is determined that not all of said numbers in the file to be executed have been read.

13. The method of claim 1, wherein said translation and storage steps comprise the steps of controlling reading of sequence reference numbers from the file to be executed, reading of data records associated with said sequence reference numbers, and, storage of said sequence reference numbers and associated data records in an output storage device.

14. The method of claim 13, further comprising the steps of controlling a determination of whether the output storage device is full after said storage of sequence reference numbers and associated data records, and, if the output storage device is determined to be full, transfer of the contents of said output storage device to a further storage device.

15. The method of claim 14, further comprising the step of controlling a determination of whether all sequence reference numbers in the file to be executed have been read.

16. The method of claim 15, further comprising the step controlling reading of further sequence reference numbers if it is determined that not all of said numbers in the file to be executed have been read.

17. In a method of operation of a digital computer connected in a network with one or more user's remote terminals, wherein a command entered at a remote terminal results in execution of a program which in turn executes a subprogram for translating the indexed file to be executed to a file in sequential format, the steps of controlling a determination of whether the file named in the entered command to be executed exists, a determination of whether the file named in the entered command to be executed is in the use by another command or program, transmission of error messages if it is determined that the named file does not exist or the named file is in use, reading of the indices from the file to be executed into storage if it is determined that the named file exists and is not is use, and transferring data referenced by said indices to output storage devices.

18. The method of claim 17, wherein the step of controlling reading of the indices from the file to be executed into storage comprises the steps of controlling reading of a portion of the sequence reference numbers from the file to be executed, storage of said portion of sequence reference numbers in an output storage device, and, a determination of whether all of the sequence reference numbers in said file to be executed have been read.

19. The method of claim 18, wherein said step of controlling transferring of data comprises the steps of controlling reading of portions of data referenced by the read sequence reference numbers in the file to be executed, and, storage of said portions of data in an output storage device in association with corresponding sequence reference numbers in a predetermined format.

20. The method of claim 19, further comprising the step of controlling further readings of said sequence reference numbers and associated data portions if it is determined that not all of the sequence reference numbers in the file have been read.

* * * * *